(12) United States Patent
Heckly (10) Patent No.: US 12,550,816 B2
(45) Date of Patent: Feb. 17, 2026

(54) AGRICULTURAL DEVICE WITH AN ACTUATOR BETWEEN TWO HANGING WORK UNITS

(71) Applicant: KUHN SAS, Saverne (FR)

(72) Inventor: Pascal Heckly, Saverne (FR)

(73) Assignee: KUHN SAS, Saverne (FR)

( * ) Notice: Subject to any disclaimer, the term of this patent is extended or adjusted under 35 U.S.C. 154(b) by 764 days.

(21) Appl. No.: 17/901,899

(22) Filed: Sep. 2, 2022

(65) Prior Publication Data

US 2023/0076839 A1    Mar. 9, 2023

(30) Foreign Application Priority Data

Sep. 7, 2021   (FR) ..................................... 21 09363

(51) Int. Cl.
*A01D 34/66*      (2006.01)
*A01B 73/04*      (2006.01)

(52) U.S. Cl.
CPC .......... *A01D 34/661* (2013.01); *A01B 73/042* (2013.01)

(58) Field of Classification Search
CPC ........ A01D 34/06; A01D 34/07; A01D 34/66; A01D 34/662; A01D 34/664; A01D 34/665; A01D 34/661; A01B 73/044; A01B 73/046; A01B 73/042
See application file for complete search history.

(56) References Cited

U.S. PATENT DOCUMENTS

| 3,473,302 | A  | * | 10/1969 | Caldwell | A01D 34/661 |
| | | | | | 56/6 |
| 9,877,423 | B2 | * | 1/2018 | Billard | A01B 73/06 |
| 9,918,430 | B2 | * | 3/2018 | Roberge | A01D 41/144 |
| 9,943,024 | B2 | * | 4/2018 | Van Loen | A01B 73/046 |

(Continued)

FOREIGN PATENT DOCUMENTS

| DE | 102008042392 A1 | * | 4/2010 | A01B 73/046 |
| EP | 672336 A1 | * | 9/1995 | A01D 34/661 |

(Continued)

OTHER PUBLICATIONS

French Preliminary Search Report issued May 19, 2022 in French Application 21 09363 filed on Sep. 7, 2021, 7 pages (with English Translation of Categories of Cited Documents & Written Opinion).

*Primary Examiner* — Adam J Behrens
(74) *Attorney, Agent, or Firm* — Oblon, McClelland, Maier & Neustadt, L.L.P.

(57) ABSTRACT

An agricultural device with two work units, the device being able to occupy a work configuration and a transport configuration and comprising a support arm pivotally mounted on a chassis around a lift axis substantially parallel to the direction of advance and around which the device is pivoted to reach the various configurations mentioned above, each unit being pivotally mounted relative to the support arm around a connecting axis, each unit comprising a respective guided end and a respective free end further away from the corresponding connecting axis than its guided end. The agricultural device includes a central actuator configured to apply on each of the units a biasing force opposed to a downward pivoting movement by its free end around the corresponding connecting axis, at least in the work configuration.

13 Claims, 8 Drawing Sheets

(56) References Cited

U.S. PATENT DOCUMENTS

| | | | | |
|---|---|---|---|---|
| 2002/0017090 A1* | 2/2002 | Hockenbeck | ........ | A01B 63/32 |
| | | | | 172/468 |
| 2015/0216121 A1* | 8/2015 | Roberge | ........... | A01D 41/144 |
| | | | | 56/14.7 |
| 2016/0150718 A1* | 6/2016 | Van Loen | ........... | A01D 34/44 |
| | | | | 56/375 |
| 2016/0255762 A1* | 9/2016 | Billard | ................ | A01B 73/06 |

FOREIGN PATENT DOCUMENTS

| | | | |
|---|---|---|---|
| EP | 1175819 A2 * | 1/2002 | ............ A01B 73/02 |
| EP | 1800530 A1 * | 6/2007 | ........... A01D 34/661 |
| EP | 2457431 A1 * | 5/2012 | ........... A01B 73/042 |
| EP | 3 143 861 A1 | 3/2017 | |
| ES | 2611174 A1 * | 5/2017 | ............ A01D 34/66 |
| NL | 2004859 C2 | 12/2011 | |
| WO | WO-9528825 A1 * | 11/1995 | ........... A01B 73/005 |
| WO | WO-9532607 A1 * | 12/1995 | ........... A01B 63/102 |
| WO | WO 2015/075356 A1 | 5/2015 | |
| WO | WO-2015086533 A1 * | 6/2015 | ........... A01B 73/042 |

* cited by examiner

AGRICULTURAL DEVICE WITH AN ACTUATOR BETWEEN TWO HANGING WORK UNITS

BACKGROUND OF THE INVENTION

Field of the Invention

The present invention concerns the field of agricultural machinery, in particular plant processing equipment and machines, and has for object an agricultural device with two work units and a tractor vehicle with such a device.

In particular, the invention is aimed at an agricultural device with a first and a second work unit. This device can occupy a work configuration, in which each unit rests at least partially on the ground, and a transport configuration. This device is connected to a chassis that can be mounted on or integrated into a tractor vehicle moving in a direction of advance.

Description of the Related Art

The type of agricultural device in question comprises a support arm pivotally mounted on the chassis around a lift axis substantially parallel to the direction of advance and around which the device is pivoted to reach the different configurations, each unit comprising a plurality of plant processing elements and extending in a respective longitudinal direction that is transverse to the direction of advance at least in the work configuration mentioned above. In addition, each unit is pivotally mounted relative to the support arm around a connecting axis that is transverse to the corresponding longitudinal direction. Each unit comprises a respective guided end and a respective free end further away from the connecting axis.

Such a device comprising two units is known in particular from the document EP-A-3071008.

The fact that each work unit is freely pivotally mounted on the support arm in question enables the device to match with the ground unevenness.

In the device disclosed by this EP document, each work unit is linked to its associated support arm by an own actuator (cylinder).

A disadvantage of such an embodiment is that it requires a large number of cylinders with higher manufacturing and servicing costs, which also results in a more complex construction. Assembling these cylinders is particularly complex due to the lack of space around the connecting axes, between the support arm and each unit, especially when the longitudinal directions of the units are included in a same plane in top view.

BRIEF SUMMARY OF THE INVENTION

The main aim of the invention is to propose a solution, for an agricultural machine of the kind mentioned above, making it possible to overcome at least this disadvantage in a simple and inexpensive way, while also providing the same functionalities.

For this purpose, the object of the invention is an agricultural device of the type mentioned above, which is further characterized in that the device comprises a central actuator configured to apply on each of the first and second work units, at least in the work configuration of the device, a biasing force opposed to a downward pivoting movement of its free end around the corresponding connecting axis.

BRIEF DESCRIPTION OF THE SEVERAL VIEWS OF THE DRAWINGS

The invention will be better understood through the following description, which refers to preferred embodiments given as non-limiting examples and explained with reference to the attached schematic drawings, in which:

FIG. 5A and

DETAILED DESCRIPTION OF THE INVENTION

FIGS. 1 to 5 illustrate, through non-limiting embodiments, an agricultural device 1 comprising a first work unit 2 and a second work unit 2', the device 1 being able to occupy a work configuration, in which each unit 2, 2' rests at least partially on the ground S, and a transport configuration.

This device 1 is connected to a chassis 3 that can be mounted on or integrated into a tractor vehicle 4 moving in a direction of advance DA, the device 1 comprising a support arm 5 pivotally mounted on the chassis 3 around a lift axis 6 substantially parallel to the direction of advance DA and around which the device 1 is pivoted to reach the different configurations (mentioned above).

Each unit 2, 2' comprises a plurality of plant processing elements 7 and extends in a respective longitudinal direction DL, DL' that is transverse to the direction of advance DA, at least in the work configuration. Each unit 2, 2' is pivotally mounted relative to the support arm 5 around a connecting axis 8, 8' that is transverse relative to the corresponding longitudinal direction DL, DL'. Each unit 2, 2' comprises a respective guided end 9, 9' and a respective free end 10, 10'. Each free end 10, 10' is situated further away from the corresponding connecting axis 8, 8' than the corresponding guided end 9, 9'.

In accordance with the invention, the agricultural device 1 is characterized in that it comprises a central actuator 12 configured to apply on each of the units 2, 2', at least in the work configuration of the device 1, a biasing force opposed to a downward pivoting movement of its free end 10, 10' around the corresponding connecting axis 8, 8'.

Thus, the invention enables to spare the assembly of cylinders between the support arm 5 and each of the units 2, 2' with a simple construction. The fact of mounting fewer cylinders between the support arm and the units also makes it possible to advantageously free up space around each connecting axis 8, 8'. In addition, the biasing force is adjusted so that in work configuration on flat ground (S), the longitudinal directions DL, DL' of the two units 2, 2' are parallel when seen in the direction of advance DA, thereby reducing the potential damage caused to the plant cover on the ground S.

Indeed, given the assembly of the units 2, 2' with the support arm 5 and the configuration of the central actuator 12, the position of one unit 2, 2' relative to the support arm 5 may affect the position of the other unit 2', 2 relative to that support arm 5.

The person skilled in the art understands that the agricultural device or equipment 1 according to the invention can be used alone (see FIGS. 1B and 3) or preferably in pairs, for example symmetrically arranged on either side of a chassis 3. Advantageously, the two units 2, 2' of each device 1 then have similar dimensions and masses, but not necessarily.

Figure 1A:
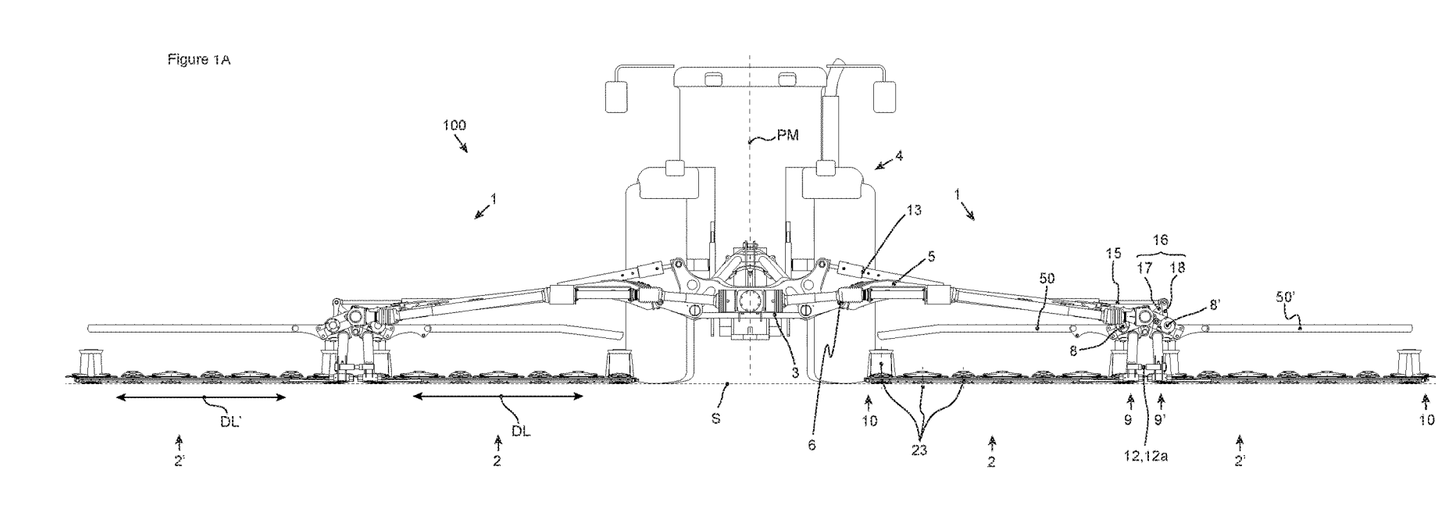
FIG. 1A is a rear view of a machine equipped with a chassis and two agricultural devices according to one embodiment of the invention, in which each unit is connected to the support arm by an own connecting axis, in the form of a disc mower mounted on the rear of a tractor vehicle and comprising one chassis and two agricultural devices occupying their work configuration (resting on the ground)
Figure 1B:
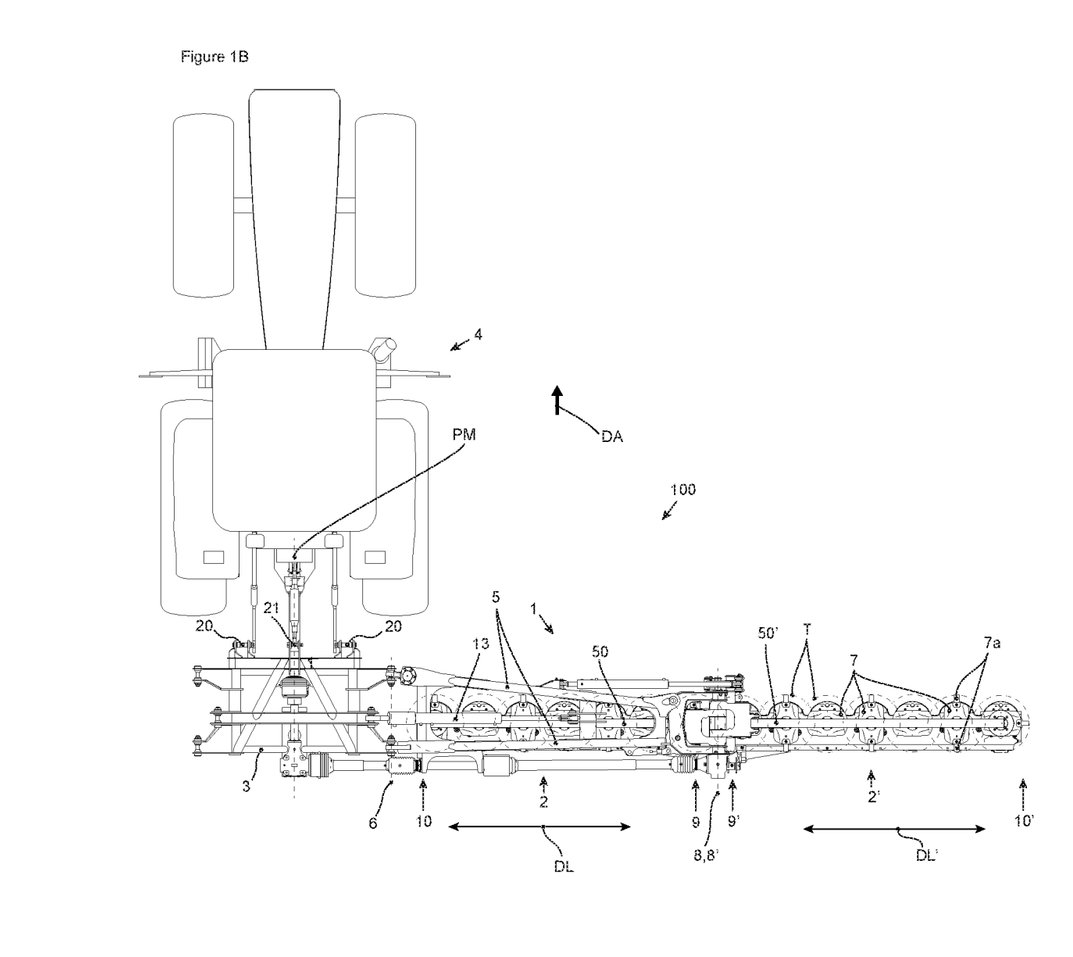
FIG. 1B is a top view of a machine hitched to a tractor vehicle and equipped with a chassis and an agricultural device according to a preferred embodiment of the invention in work configuration.

Preferably, the two longitudinal directions DL, DL' are parallel to each other, at least seen from above (FIG. 1B), in the work configuration. Preferably, the two longitudinal directions DL, DL' are comprised in a same plane in top view, at least in the work configuration (see FIGS. 1 and 4), thus optimizing the width of the device 1 in the work configuration prorated to the number of processing elements 7. It should be noted that the width of the device 1 corresponds to the dimension in the longitudinal direction DL of the first unit 2, and preferably in the longitudinal dimensions DL, DL' of both units 2, 2'. In addition, this reduce the length of the device 1 in the direction of advance DA. The two longitudinal directions DL, DL' are preferably perpendicular to the direction of advance DA at least in the work configuration, thereby increasing the width of the device 1 in the work configuration.

Figure 5A:
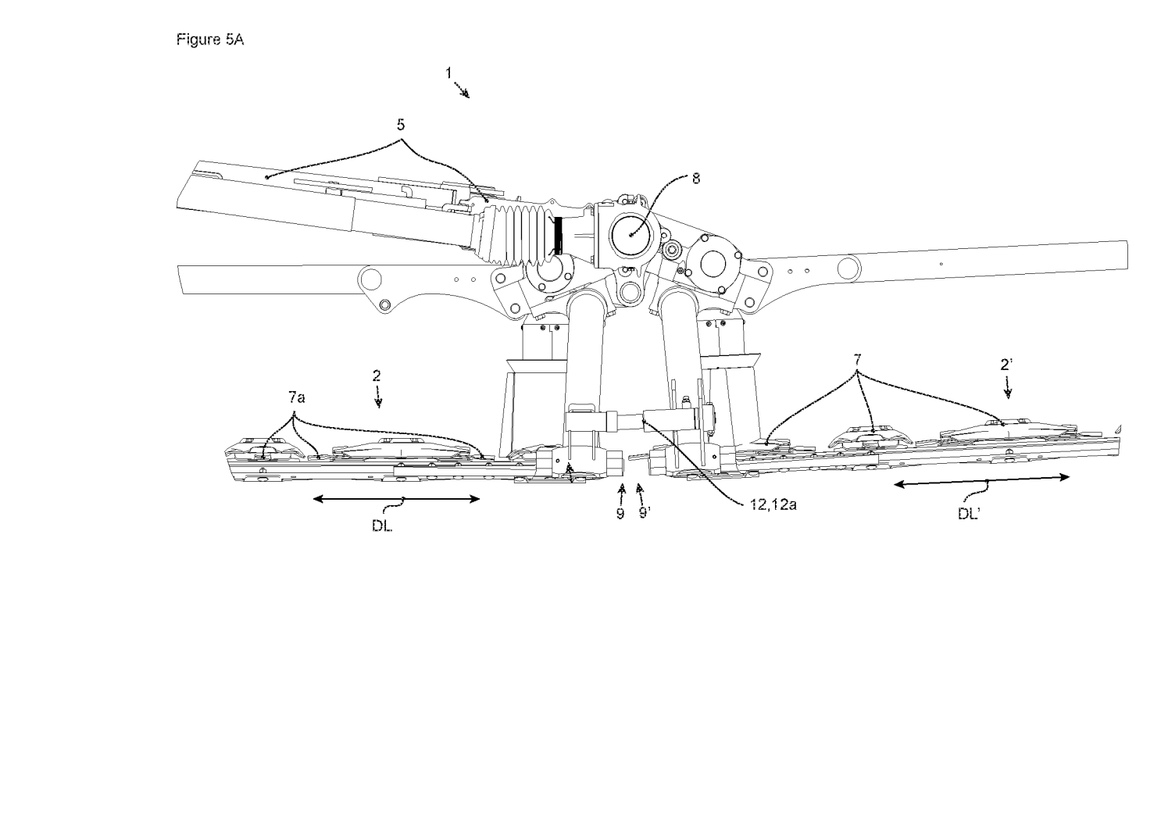
Figure 5B:
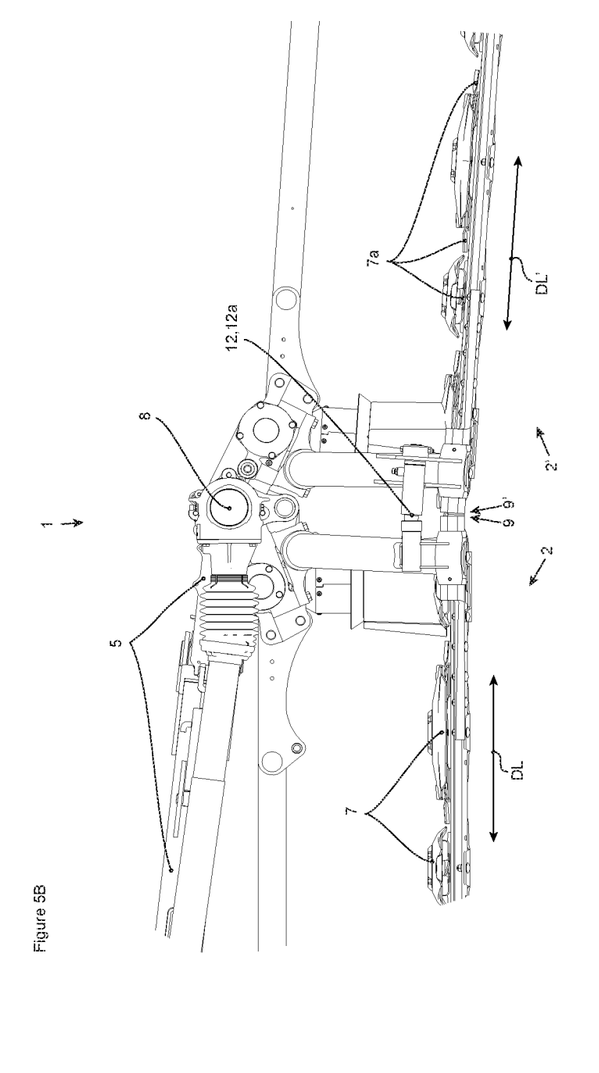
FIG. 5B are partial, detailed, different-scale views of the device shown in FIG. 4, respectively illustrated with the central actuator extended and retracted as far as possible.

As shown in FIG. 5B, the central actuator 12 can contract itself in such a way that the longitudinal directions DL, DL' form a downward angle less than 180°, allowing to further match with ground S unevenness. When the guided ends 9, 9' support each other, the central actuator 12 is contracted as much as possible.

Figure 6:
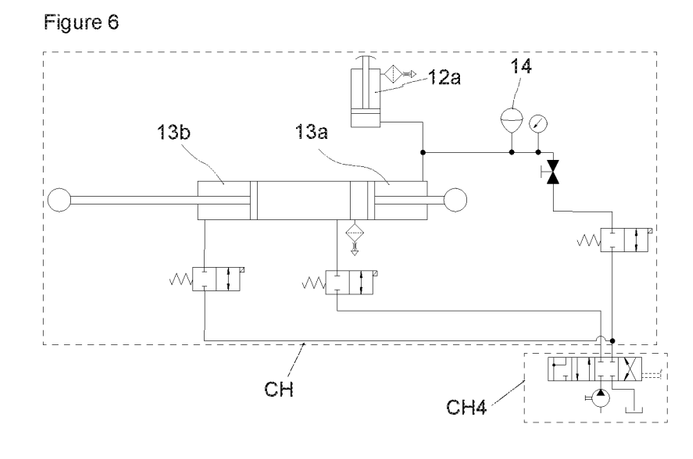
FIG. 6 is a simplified representation of the hydraulic circuit of the device connected to the hydraulic circuit of the tractor vehicle according to the invention.

Advantageously, the central actuator 12 comprises or consists of a hydraulic central cylinder 12a. The device 1 comprises an hydraulic circuit CH (FIG. 6). In order to simplify the device 1 and its hydraulic circuit CH, the central cylinder 12a is single-acting and linear. The central cylinder 12a extends, in the work configuration, at least partially between the two units 2, 2' and below the or each connecting axis 8, 8'.

The central cylinder 12a extends at least substantially parallel to one of the longitudinal directions DL, DL'. Thus, the biasing force is directed substantially parallel to at least one of the longitudinal directions DL, DL'. Preferably, the central cylinder 12a cannot pivot relative to the second unit 2' according to an axis parallel to the direction of advance DA, ensuring some dampening when the guided ends 9, 9' of the units 2, 2' come into contact. The body of the central cylinder 12a is preferably attached to the second unit 2', e.g. by welding. Due to the articulation of the units 2, 2' around the or each connecting axis 8, 8', the biasing force of the central cylinder 12a can cause the free end 10, 10' of at least one of the units 2, 2' to pivot upward around its connecting axis 8, 8'.

Alternatively, the central actuator 12 may also comprise or consist of a spring. Depending on another variant, the central actuator 12 may also comprise or consist of a rotary cylinder.

In order for the device 1 to have reduced dimensions when it is not in use or is to be transported, the second unit 2' can be moved relative to the first unit 2 around the corresponding connecting axis 8, 8' to a folded position. In the folded position, the support arm 5 is located at least partially between the processing elements 7 of the first unit (2) and the processing elements 7 of the second unit 2'. In the transport configuration of the device 1, the support arm 5 is oriented substantially vertically. In the transport configuration of the device 1, the support arm 5 is located at least partially between the units 2, 2'. Respectively, in the transport configuration of the device 1, the support arm 5 is located at least partially between the processing elements 7 of the first unit 2 and the processing elements 7 of the second unit 2'. In the transport configuration, the units 2, 2' extend parallel to each other, thereby reducing the dimensions of the device 1. Preferably, in the transport configuration, the units 2, 2' also extend substantially parallel to the support arm 5. In the transport configuration, the support arm 5 is substantially perpendicular to the direction of advance DA. The chassis 3 is preferably at least substantially symmetrical relative to a midplane PM. The tractor vehicle 4 is also preferably symmetrical relative to the midplane PM. In the transport configuration, the support arm 5 is parallel to the midplane PM.

As shown in FIG. 1 in particular, each unit 2, 2' comprises a longitudinal beam 50, 50' located above the processing elements 7 in the work configuration. The or each longitudinal beam 50, 50' preferably extends parallel to the respective longitudinal direction DL, DL'. In the transport configuration, the support arm 5 is preferably located between the longitudinal beams 50, 50' respectively of the first and second units 2, 2', avoiding the need to modify one of the units or both units 2, 2' so that it can accommodate the support arm 5 in the transport configuration.

Figure 2:
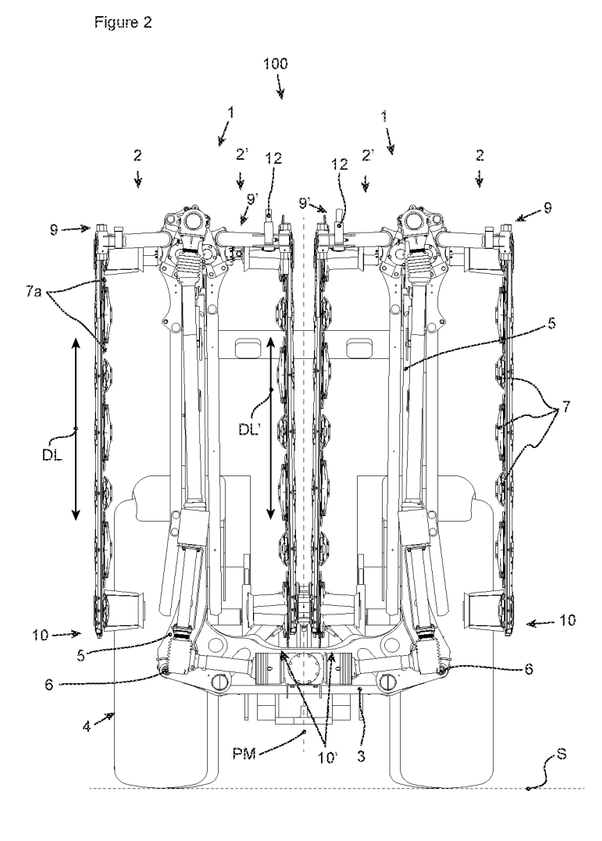
FIG. 2 is a rear view of a machine equipped with agricultural devices according to the preferred variant, hitched to and/or carried by a tractor vehicle, the agricultural devices being in their transport configuration.

In order to make the folding easier and to simplify the relative movements between the units 2 and 2', the central actuator 12 is unfastened from one of the units 2, 2' at least in transport configuration (FIG. 2). As the figures show, the central actuator 12 is preferably rigidly fastened to only one of the two units 2, 2' and rests on the other unit 2, 2', at least in the work configuration and preferably also in the headland configuration, allowing the free ends 10, 10' of the units 2, 2' to pivot upward in the work configuration beyond the maximum extension of the central actuator 12. In addition, this feature allows the device 1 to be switched (1) to the transport configuration without having to get off the tractor 4 and/or without any additional action. Thus, the central actuator 12 is preferably unfastened from one of the units 2, 2' regardless of the configuration of the device 1.

Advantageously, in the work configuration, the central actuator 12 is rigidly fastened to the second unit 2'. As shown by the figures, the second unit 2' is preferably the outermost unit relative to the chassis 3 in the work configuration. In the work configuration, the central actuator 12 is at least resting on the first unit 2 and preferably also in the headland configuration. The central actuator 12 is thus in a sphere-plane link with one of the work units 2, 2' and preferably the first unit 2. The first unit 2 is closest to the chassis 3 in the work configuration. Alternatively, the central actuator 12 may be rigidly fastened to the two units 2, 2' in the work configuration and be unfastened from the first unit 2 in the transport configuration. For example, the central actuator 12 could be rigidly fastened, in the work configuration, to the first unit 2 by a bolt that can be removed to switch to the transport configuration.

By implementing a simple sphere-plane link (or punctual link), at least in the work configuration, between the central actuator 12 and one of the work units 2, 2', it is possible to bring the guided ends 9, 9' of the units 2, 2' sufficiently apart from each other, even with a short-stroke linear central actuator 12. In addition, the result is a simplified connection with the unit 2 to which the central actuator 12 is not permanently connected.

According to an advantageous provision, the device 1 is also configured to occupy a headland configuration in which the support arm 5 is slightly raised around the lift axis 6 relative to its position in the work configuration, allowing the device 1 to move without interfering with the ground S and without having to switch it into the transport configuration, especially for U-turns at the end of the field. In the headland configuration (FIG. 3), the central actuator 12 is preferably extended as far as possible, bringing the free end 10' of the second unit 2' further away from the ground S. In fact, since the free end 10' of the second unit 2' is the most distant from the chassis 3, it has a greater risk of coming into contact with the ground S when the device 1 is travelling on uneven ground S. The tractor vehicle 4 comprises a hydraulic circuit CH4. To lengthen the central actuator 12, the central cylinder 12a is preferably supplied with pressurized fluid. Preferably, this fluid comes from the hydraulic circuit CH4 of the tractor vehicle 4 carrying or incorporating the device 1, as shown in FIG. 6. In the headland configuration, the central cylinder 12a is fed with fluid so that it is extended. Thus, in the headland configuration of the device 1, the central actuator 12 applies on each of the units 2, 2' a biasing force opposed to a downward pivoting movement of its free end 10, 10' around the corresponding connecting axis 8, 8'.

In an alternative embodiment that is not represented, the central actuator 12 is connected to the hydraulic circuit CH4 of the tractor vehicle 4 by a valve, e.g. a pressure control valve, so as to apply on each of the units 2, 2', at least in the work configuration of the device 1, a biasing force opposed to a downward pivoting movement of the free end 10, 10' of each of the units 2, 2' around the corresponding connecting axis 8, 8'.

In the preferred embodiment, the central cylinder 12a is hydraulically connected to at least one energy accumulator 14, at least in the work configuration of the device 1. In addition, in the work configuration, the central cylinder 12a and the energy accumulator 14 are in closed circuit, as shown in FIG. 6. This way, the units 2, 2' can pivot relative to the support arm 5 around the corresponding connecting axis 8, 8' according to the unevenness of the ground S, when the device 1 is moving in the work configuration. Preferably, the central cylinder 12a is hydraulically connected to the energy accumulator 14 in a closed circuit, in the headland configuration. Such a hydraulic circuit CH also makes it possible to damp the downward pivoting movements of the second unit 2' around its connecting axis 8, 8' when the guided ends 9, 9' of the units 2, 2' come close to one another. The guided ends 9, 9' of the units 2, 2' come close to one another especially when the agricultural device 1 is in its headland configuration, when he is moved and the ground S unevenness induces the pivoting of the second unit 2' around the corresponding connecting axis 8, 8'.

It becomes clear from the above that in the preferred embodiment, the central cylinder 12a is connected to the energy accumulator 14 so as to apply on each of the units 2, 2' a biasing force opposed to a downward pivoting movement of the free ends 10, 10' around the associated connecting axis 8, 8' in the work and headland configurations.

Figure 3:
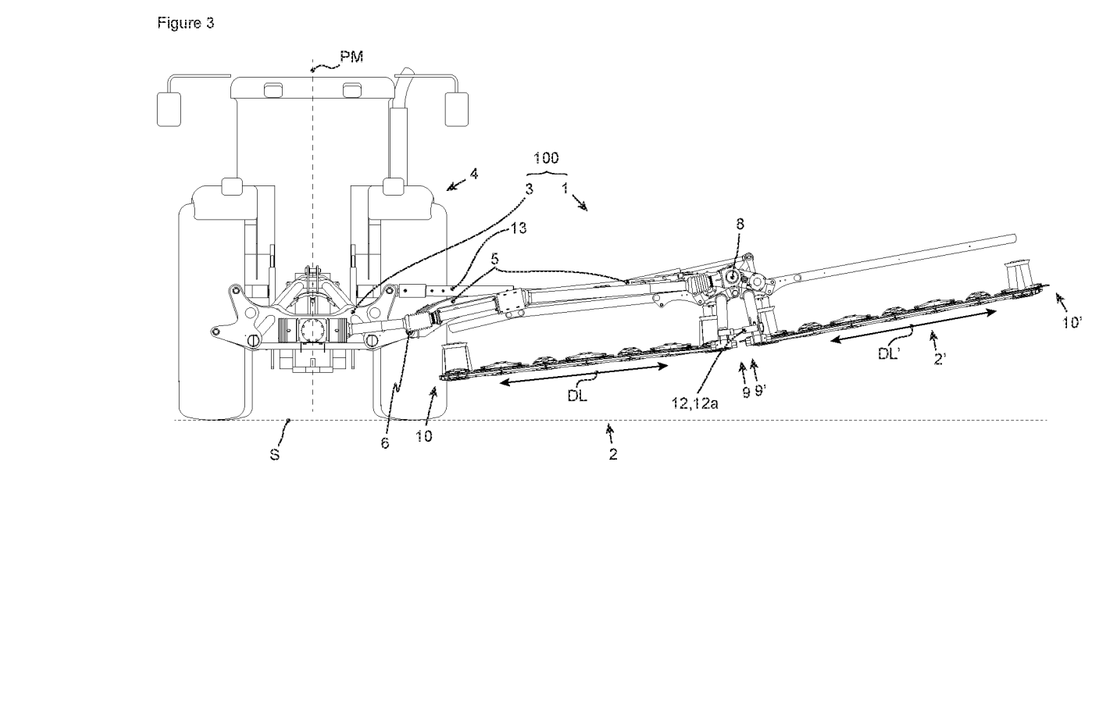
FIG. 3 is a rear view of the machine in FIG. 1B hitched to a tractor vehicle, the agricultural device being in its headland configuration.
Figure 4:
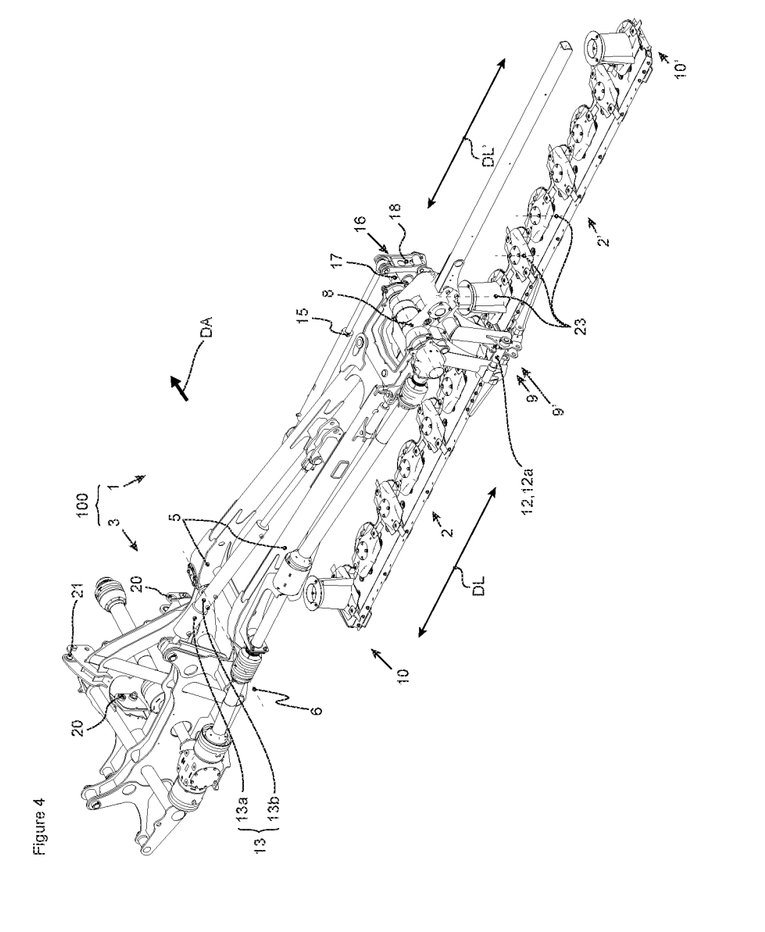
FIG. 4 is a perspective view of the machine (alone) shown in FIG. 1B.

In accordance with another possible aspect of the invention, the device 1 may also comprise a headland actuator 13 connecting the support arm 5 to the chassis 3. The headland actuator 13 is configured to be able to make the support arm 5 pivot around the lift axis 6 at least between the work configuration and the headland configuration (FIGS. 3 and 4). In the work configuration, the headland actuator 13 preferentially applies an upward force on the support arm 5, thereby making it possible to reduce the pressure exerted by the device 1 on the ground S and thus reducing the damage that can be caused to the plant cover when moving. The headland actuator 13 could thus, in particular, comprise or consist of a tension spring. In combination with the headland actuator 13, the central actuator 12 then makes it possible to better distribute the pressure exerted on the ground S by each unit 2, 2', in the work configuration. This combination makes it in particular possible to reduce the pressure exerted by each unit 2, 2' at the free ends 10, 10'. This combination thus makes it possible to reduce the damage that may be caused to the plant cover when the device 1 is moving, by implementing only a single central actuator 12 and through a simple construction.

The above highlights that, without a central actuator 12, the headland actuator 13 would tend to increase the pressure exerted on the ground(S) by the units 2, 2' at the free ends 10, 10' of the first 2 and second 2' units. Without a central actuator 12, the headland actuator 13 would thus tend to decrease the pressure exerted on the ground(S) by the units 2, 2' at the guided ends 9, 9' of the first 2 and second 2' units, or even to lift the guided ends 9, 9' from the ground S. In combination with the headland actuator 13, the central actuator 12 makes it possible to reduce the difference between the pressure exerted on the ground(S) at the free end 10, 10' and the pressure exerted on the ground S at the guided end 9, 9' of each unit 2, 2'. The central actuator 12, respectively, the central cylinder 12a, is sized to evenly distribute the pressure exerted on the ground(S) at the ends 9, 9', 10, 10' of each unit 2, 2'. Preferably, the central cylinder 12a is sized to evenly distribute the pressure exerted on the ground S by each unit 2, 2' along its whole length, on a flat and horizontal ground(S).

Preferably and as shown in FIG. 4, the headland actuator 13 comprises or consists of a headland cylinder 13a. The headland cylinder 13a is preferably of the hydraulic linear cylinder type. In the work configuration, the headland cylinder 13a is preferably hydraulically connected to an energy accumulator, so as to apply an upward force on the support arm 5. Such a hydraulic circuit CH also allows the support arm 5, and therefore the units 2, 2', to pivot around the lift axis 6 according to the ground(S) unevenness (when moving in the direction of advance DA).

The headland cylinder 13a is advantageously hydraulically connected to the central cylinder 12a, so that only one action is needed to operate the headland cylinder 13a and the central cylinder 12a. This connection simplifies the hydraulic circuit CH of the device 1.

Preferably, the headland cylinder 13a is single-acting. It is furthermore arranged and connected to the same energy accumulator 14 as the central cylinder 12a, so as to apply on the support arm 5 an upward force around the lift axis 6 in the work configuration, and preferably also in the headland configuration. The energy accumulator 14 is preferably of the oleo-pneumatic type. With the energy accumulator 14, the central cylinder 12a applies on the support arm 5 an upward force around the lift axis 6 in the work and headland configurations when the energy accumulator 14 and the central cylinder 12a are in a closed circuit. Preferably, the headland cylinder 13a and the central cylinder 12a are sized so as to evenly distribute the pressure exerted on the ground(S) by the two units 2, 2'. Specifically, the headland cylinder 13a and the central cylinder 12a are sized to evenly distribute the pressure exerted on the ground S at the free end 10 of the first unit 2, the pressure exerted on the ground S at the guided end 9 of the first unit 2, the pressure exerted on the ground S at the free end 10' of the second unit 2', and the pressure exerted on the ground S at the guided end 9' of the second unit 2', on flat and horizontal ground S in the work configuration of the device 1.

As shown in FIG. 4, the headland actuator 13 may include a transport cylinder 13b making it possible to bring the support arm 5 to pivot around the lift axis 6 between the headland configuration and the transport configuration. Preferably, the headland actuator 13 is advantageously mounted in an articulated manner with the chassis 3 at one of its ends and with the support arm 5 at its other end. In an alternative embodiment, the headland cylinder 13a is also used to bring the support arm 5 to pivot between the headland configuration and the transport configuration.

In relation to a preferential application of the invention, emerging from the figures, each unit 2, 2' comprises or consists of a cutter bar equipped with a plurality of processing elements 7. Each processing element 7 is driven in rotation around a respective body axis 23 that is substantially vertical in the work configuration. In the transport configuration, the body axes 23 of the two units 2, 2' are preferably parallel to one another. Each processing element 7 comprises at least two cutting tools 7a forming a trajectory T overlapping the trajectory or trajectories T of the adjacent cutting tools 7a In addition, the trajectories T of the cutting tools 7a of processing elements 7 of each unit 2, 2' closest to the guided ends 9, 9' advantageously overlap in the work configuration on flat ground S, thus avoiding leaving a strip of plants uncut.

In order to disrupt at a minimum the flow of plants cut by the cutting tools 7a of the device 1, the central actuator 12 is located at the rear of the processing elements 7.

As shown by the figures, the first unit 2 extends in a longitudinal direction DL transverse to the direction of advance DA in the work configuration. The first unit 2 is pivotally mounted relative to the support arm 5 around the connecting axis 8. The first unit 2 has a guided end 9 and a free end 10. The free end 10 of the first unit 2 is further away from the connecting axis 8 than the corresponding guided end 9.

The variant embodiments of the invention shown in the attached figures are described in more detail below.

In the present document, the agricultural device 1 may occupy at least three configurations, namely a work configuration, a headland configuration and a transport configuration.

These three configurations illustrated on the figures for a specific agricultural device 1, namely a mowing device with two units 2, 2', can be defined as follows. In the work configuration (FIGS. 1A and 1B), the first unit 2 and the second unit 2' rest on the ground S at least partially and their longitudinal directions are substantially parallel, at least viewed from a body axis 23.

In the headland and transport configurations, the width of the device 1 is reduced. In the headland configuration (FIG. 3), the units 2 and 2' are moved away from the ground S at least by pivoting the support arm 5 around the lift axis 6, and preferably each unit 2, 2' is pivoted around the corresponding connecting axis 8, 8'. The device 1 may also comprise a sidewall actuator linking the support arm 5 to the first unit 2 and configured to allow the pivoting and/or the holding in position of the first unit 2 around the corresponding connecting axis 8, 8'. For this purpose, the sidewall actuator is far from the corresponding connecting axis 8, 8'.

To switch from the work configuration to the headland configuration, the free end 10 of the first unit 2 is pivoted around the corresponding connecting axis 8, 8' by the sidewall actuator, with an upward-pivoting start, the second unit 2' is pivoted by the central actuator 12 around the corresponding connecting axis 8, 8' in the opposite direction, while the support arm 5 is pivoted around the lift axis 6 in the same direction as the second unit 2'.

The device 1 may also comprise a folding cylinder 15 linking the support arm 5 to a compass 16 with a first rod 17 articulated to the folding cylinder 15 on one hand and to the first unit 2 on another hand, as well as a second rod 18 articulated to the folding cylinder 15 on one hand and to the second unit 2' on another hand.

Preferably, to reach the transport configuration, the device 1 must first be in the headland configuration. To switch from the headland configuration to the transport configuration, the free end 10' of the second unit 2' is pivoted by the folding actuator 15 around the corresponding connecting axis 8, 8', on an angular sector slightly lower than 180°, with an upward-pivoting start, while the end of the support arm 5 opposite to the articulated end with the chassis 3 is pivoted by the headland actuator 13 around the lift axis 6 relative to the chassis 3 in the same direction, until the longitudinal directions DL, DL' are at least substantially vertical.

The agricultural device 1 or the agricultural machine 100 comprising two devices 1 as described above may comprise, as shown in FIGS. 1 to 3, a specific chassis 3 of its own by which it may be hitched to a coupling device of a tractor vehicle 4, allowing (releasable and temporary) mounting to the front or back of the tractor vehicle 4. For this purpose, the chassis 3 may in particular comprise two lower pins 20 and one upper pin 21 in order to be connected to the three-point hitch of an agricultural tractor vehicle 4. Preferably, the midplane PM passes through the upper pin 21 of the chassis 3. The direction of advance DA is substantially perpendicular to the axis passing through the two lower pins 20 and preferably substantially horizontal. The chassis 3 may however also be integrated into the tractor vehicle 4 or be merged with the chassis of the tractor vehicle. The device 1 is designed for movement on flat, and preferentially horizontal ground S.

Preferably, the central actuator 12 applies a biasing force on each of the first 2 and second 2' units, with these biasing forces being mutually opposed and of the same intensity. The central actuator 12 also has a limited operational stroke. When it is retracted as far as possible, the guided ends 9, 9' of the first and second units 2, 2' are preferably in contact (FIG. 5B). As can be seen in FIG. 5B, when the central cylinder 12a is retracted as far as possible, the angle between the longitudinal direction DL of the first unit 2 and the longitudinal direction DL' of the second unit 2' is between 0 and 10°, seen in the direction of advance DA. It can be seen from FIG. 5A that when the central cylinder 12a is extended as far as possible, the angle between the longitudinal direction DL of the first unit 2 and the longitudinal direction DL' of the second unit 2' is also between 0 and 10°, seen in the direction of advance DA.

Where unevenness of the ground S requires the central actuator 12 to be extended as far as possible and unfastened from one of the units 2, 2', the free end 10, 10' of at least one unit 2, 2' may continue its upward pivoting around the corresponding connecting axis 8, 8', in which case the central actuator 12 no longer transmits any biasing force between the first unit 2 and the second unit 2'.

The result is an opportunity to choose a central actuator 12 with a limited stroke and low price, especially in the form of a hydraulic cylinder 12a, which allows easy adjustment of the biasing force provided by this cylinder and therefore of the maximum pressure applied on the ground S by each of the units 2, 2', which are connected together to the support arm 5.

In order to advantageously facilitate the construction of the device 1 and to make it more compact, robust, easier to manufacture and less expensive, the connecting axes 8, 8' of the two units 2, 2' are coincident. The connecting axis 8, 8' common to the two units 2, 2' then also makes a pivot link between the two units 2 and 2'. The longitudinal directions DL, DL' of the latter are both situated in a same plane perpendicular to the corresponding connecting axis 8, 8'. In the headland configuration, the units 2 and 2', respectively their longitudinal directions DL, DL', also remain substantially aligned.

Alternatively, as shown in FIG. 1, each unit 2, 2' may also be connected to the support arm 5 by a separate connecting axis 8, 8' of its own.

As shown in FIGS. 4 and 5B in particular, the or each connecting axis 8, 8' is arranged substantially perpendicular to the longitudinal direction DL, DL' of at least one unit 2', 2, preferably of both. Preferably, the or each connecting axis 8, 8' is substantially parallel to the direction of advance DA. In addition, the or each connecting axis 8, 8' is advantageously located at a distance above the central actuator 12 in the work configuration. In this way, the central actuator 12 does not interfere with the switch between the work and transport configurations. In a preferential way, the distance between the central actuator 12 and the or each connecting axis 8, 8' is greater than one-quarter, more preferentially than half the diameter of the outer trajectory T of the cutting tools 7a of a processing element 7. Indeed, the further away the central actuator 12 is from the or each connecting axis 8, 8', the less biasing force needs to be provided. Preferably, the distance between the central actuator 12 and the or each connecting axis 8, 8' is substantially equal to the diameter of the outer trajectory T of the cutting tools 7a of a processing element 7.

When the connecting axes 8, 8' of the two units 2, 2' are coincident, the connecting axis 8, 8' is situated preferably equidistant from the two guided ends 9 and 9' and preferably equidistant between the two free ends 10 and 10'. This results in a balanced assembly of the units 2 and 2' relative to the connecting axis 8, 8'. In addition, the dimensions of the device 1 in the transport configuration is reduced.

Thus, the articulation device between the support arm 5 and the chassis 3 allows at least one pivoting according to the lift axis 6 substantially parallel to the direction of advance DA, at least in the work configuration. Preferably the lift axis (6) is substantially horizontal in the work configuration. For example, it is composed of two ball joints, preferably placed in front of each other according to the direction of advance DA. The lift axis 6 passes through these two ball joints. In an alternative embodiment, this lift axis 6 can also be inclined backwards and/or form an angle with the direction of advance DA.

Advantageously, the support arm 5 is of an elongated shape and, in the work configuration, oriented substantially horizontal and/or parallel to the ground S. More specifically, the plane passing through the lift axis 6 and the or each connecting axis 8, 8' is substantially horizontal in the work configuration. The support arm 5 is also oriented transversely, and preferably perpendicularly to the direction of advance DA. In an alternative embodiment, the device 1 can be mounted on a front hitch of the tractor vehicle 4: the lift axis 6 between the support arm 5 and the chassis 3 is then oriented perpendicularly to the direction of advance DA and horizontally and/or parallel to the ground S, the support arm 5 being oriented parallel to the direction of advance DA and substantially horizontally and preferably slightly inclined toward the rear.

The invention also relates to an agricultural machine 100 comprising a chassis 3 that can be mounted on or integrated into a tractor vehicle 4 moving in a direction of advance DA, this agricultural machine 100 being characterized in that it comprises two agricultural devices 1 as described above, preferably arranged symmetrically relative to a midplane PM of the tractor vehicle 4.

According to another not represented application of the invention, each processing element 7 is equipped with teeth, each work unit 2, 2' forming a plant gathering or collecting unit.

Of course, the invention is not limited to the embodiments described and shown in the attached drawings. Modifications remain possible, in particular as regards the composition of the various elements or the substitution by technical equivalents without departing from the scope of protection of the invention.

The invention claimed is:
1. An agricultural device comprising:
a first work unit and a second work unit, the device being able to occupy a work configuration, in which each work unit rests at least partially on a ground, and a transport configuration, the device being connected to a chassis that is mounted on or integrated into a tractor vehicle moving in a direction of advance; and
a support arm pivotally mounted on the chassis around a lift axis substantially parallel to the direction of advance and around which the device is pivoted to reach the work and transport configurations,
each work unit comprising a plurality of plant processing elements and extending in a respective longitudinal direction that is transverse to the direction of advance at least in the work configuration,
each work unit being pivotally mounted relative to the support arm around a connecting axis that is transverse relative to the corresponding longitudinal direction, each work unit comprising a respective guided end and a respective free end further away from the corresponding connecting axis than the corresponding guided end,
wherein the agricultural device comprises a central actuator consisting of a central cylinder, rigidly fastened to at least one of the first and second work units and connected to the other of the first and second work units such that the central actuator is configured to apply on each of the work units, at least in the work configuration of the device, a biasing force opposed to a downward pivoting movement of its free end around the corresponding connecting axis.

2. The device according to claim 1, wherein the central cylinder extends in the work configuration at least partially between the first and second work units and below each connecting axis.

3. The device according to claim 2, wherein the central cylinder is hydraulically connected to at least one energy accumulator, at least in the work configuration of the device.

4. The device according to claim 1, wherein in the transport configuration of the device, the support arm is oriented substantially vertically and located at least partially between the first and second work units.

5. The device according to claim 1, wherein the central actuator is fastened to only one of the first and second work units, at least in the transport configuration.

6. The device according to claim 1, wherein the central actuator is rigidly fastened to only one of the first and second work units, and rests against the other of the first and second work units, at least in the work configuration.

7. The device according to claim 1, wherein the device is also configured to occupy a headland configuration in which the support arm is slightly raised around the lift axis relative to its position in the work configuration and in which the central actuator is extended as far as possible.

8. The device according to claim 1, wherein the device comprises a headland actuator that links the support arm to the chassis, the headland actuator comprising a headland cylinder hydraulically connected to an energy accumulator so as to apply an upward force on the support arm in the work configuration.

9. The device according to claim 8, wherein in the work configuration, the headland cylinder is hydraulically connected to the central cylinder.

10. The device according to claim 7, wherein in the headland configuration of the device, the central actuator applies on each of the first and second work units a biasing force opposed to a downward pivoting movement of its free end around the corresponding connecting axis.

11. The device according to claim 1, wherein the connecting axes of the first and second work units are coincident.

12. The device according to claim 1, wherein each work unit comprises a cutter bar equipped with the plurality of processing elements, each of the processing elements being driven in rotation around a substantially vertical body axis and comprising at least two cutting tools that form a trajectory overlapping the trajectories of the adjacent cutting tools and wherein the trajectories of the cutting tools of the processing elements which are closest to the guided ends for the respective unit, overlap in the work configuration on flat ground.

13. An agricultural machine comprising:
a chassis that is mounted on or integrated into a tractor vehicle moving in a direction of advance, and two devices according to claim 1, the two devices being symmetrically arranged relative to a midplane of the chassis.

* * * * *